United States Patent [19]

Pechhold et al.

[11] Patent Number: 5,750,445
[45] Date of Patent: May 12, 1998

[54] TREATMENT OF POLYAMIDE MATERIALS WITH PARTIAL FLUOROESTERS OR FLUOROTHIOESTERS OF MALEIC ACID POLYMERS AND SULFONATED AROMATIC CONDENSATES

[75] Inventors: Engelbert Pechhold, Chadds Ford, Pa.; Peter Michael Murphy, Ooltewah, Tenn.

[73] Assignee: E. I. du Pont de Nemours and Company, Wilmington, Del.

[21] Appl. No.: 854,234

[22] Filed: May 9, 1997

Related U.S. Application Data

[62] Division of Ser. No. 532,294, Sep. 22, 1995, Pat. No. 5,670,246.

[51] Int. Cl.$^6$ .................................................. B32B 7/00
[52] U.S. Cl. ...................... 442/168; 442/94; 442/177; 525/326.2; 525/326.4; 525/326.7; 525/327.4; 525/327.8
[58] Field of Search ...................... 442/94–168, 177; 525/326.2, 326.4, 326.7, 327.4, 327.8

[56] References Cited

U.S. PATENT DOCUMENTS

| | | | |
|---|---|---|---|
| 4,070,152 | 1/1978 | Pentz | 8/115.6 |
| 4,501,591 | 2/1985 | Ucci et al. | 8/495 |
| 4,592,940 | 6/1986 | Blyth et al. | 428/96 |
| 4,680,212 | 7/1987 | Blyth et al. | 428/97 |
| 4,822,373 | 4/1989 | Olson et al. | 8/115.6 |
| 4,883,839 | 11/1989 | Fitzgerald et al. | 525/136 |
| 4,948,650 | 8/1990 | Fitzgerald et al. | 428/96 |
| 4,963,409 | 10/1990 | Liss et al. | 428/96 |
| 5,074,883 | 12/1991 | Wang | 8/115.6 |
| 5,131,909 | 7/1992 | Hangey | 8/115.6 |
| 5,310,828 | 5/1994 | Williams | 525/502 |

FOREIGN PATENT DOCUMENTS

| | | |
|---|---|---|
| 0 383 310 A | 8/1990 | European Pat. Off. |
| 0 609 456 A | 8/1994 | European Pat. Off. |
| 0 632 157 A | 1/1995 | European Pat. Off. |
| 60 147418 A | 8/1985 | Japan . |
| WO 89 02949 A | 4/1989 | WIPO . |
| WO 92 15748 A | 9/1992 | WIPO . |
| WO 93 19238 A | 9/1993 | WIPO . |

*Primary Examiner*—Helen Lee

[57] ABSTRACT

The present invention comprises a process for providing soil resistance and resistance to staining by acid dyes to fibers and textiles by simultaneous or sequential application of a sulfonated phenol-formaldehyde condensation product and partial fluoroesters or fluorothioesters formed from copolymers of maleic anhydride and perfluoroalkyl alcohols or perfluoroalkyl thiols.

11 Claims, No Drawings

TREATMENT OF POLYAMIDE MATERIALS WITH PARTIAL FLUOROESTERS OR FLUOROTHIOESTERS OF MALEIC ACID POLYMERS AND SULFONATED AROMATIC CONDENSATES

This is a division of application Ser. No. 08/532,294 filed Sep. 22, 1995, now U.S. Pat. No. 5,670,246.

FIELD OF THE INVENTION

The present invention comprises a process for providing soil resistance and resistance to staining by acid dyes to fibers and textiles by simultaneous or sequential application of a sulfonated phenol-formaldehyde condensation product and partial fluoroesters or fluorothioesters formed from copolymers of maleic anhydride and perfluoroalkyl alcohols or perfluoroalkyl thiols.

CROSS REFERENCE TO RELATED APPLICATION

U.S. patent application Ser. No. 08/532,294, now U.S. Pat. No. 5,676,246 relating to the use of new partial fluoroesters or fluorothioesters formed from copolymers of maleic anhydride and perfluoroalkyl alcohols or perfluoroalkyl thiols and a process for their one-step application to textiles and fibers to provide both soil and stain resistance was filed simultaneously with the present application.

BACKGROUND OF THE INVENTION

Polyamide, silk, and wool fibers are subject to soiling. Several of the currently used soil resist agents for nylon carpets are based on polymers derived from perfluoroalkylethyl alcohols. Usually the stain resist agents are applied from aqueous medium under conditions of controlled pH. The affinity or exhaust of the stain resist agents are the highest below pH 3. Often surfactants are used to help solvate the stain resist agents at low pH.

On the other hand, while the fluorochemical soil resist agents are effective in protecting the fiber from soil, they offer little protection from stains caused by acid dyes. Since the fluorochemical soil resist agents do not exhaust from aqueous solutions, they are usually applied in a separate operation from stain resists by either spraying, padding or foaming followed by a drying step. Co-application of the stain resist and soil resist would be more economical. However, we have found that co-application of conventional stain resists and soil resists does not provide the desired properties.

Sulfonated aromatic condensates provide outstanding stain resistance and durability towards washing or shampooing of polyamide fibers to acid dyes, but they have a tendency to turn yellow over time and accelerate soiling. The discoloration problem has been addressed in patents involving blends of these with polymeric methacrylic or maleic acids. (e.g., by Fitzgerald in U.S. Pat. No. 4,883,839 and U.S. Pat. No. 4,948,650).

While the performance of stain resistant compositions have been improved, none of the commercial stain resists offer acceptable protection from soiling. Improvement in soiling still requires treatment with fluorochemical-based compounds in a separate step.

The present invention provides durable protection for both staining and soiling to polyamide carpets, upholstery and other natural fibers such as wool or silk in a single step by the simultaneous or sequential treatment of polyamide or natural materials with partial fluoroesters or fluorothioesters of maleic acid copolymers and sulfonated aromatic condensates.

SUMMARY OF THE INVENTION

This invention is directed to a process for the simultaneous or sequential treatment of fibers and textiles with partial fluoroesters or fluorothioesters of maleic acid copolymers and sulfonated aromatic condensates to provide durable protection to both staining and soiling to polyamide carpets, upholstery and other natural fibers such as wool or silk in a single step.

The present invention comprises a process for providing soil resistance and resistance to staining by acid dyes to fibers and textiles comprising application of an effective amount of a composition comprising a mixture of 1) a sulfonated phenol-formaldehyde condensation product which is useful as a dye-resist agent, a dye-fixing agent, a dye-reserving agent, or an agent which improves the wet-fastness of dyeings on polyamide fibers, and 2) a copolymer having units of formula II

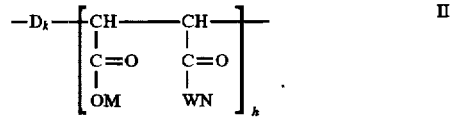

wherein

D is a vinyl monomer selected from the group consisting of styrene, vinyl ether, and alpha olefin;

M is H, alkali metal or ammonium cation;

W is O, S, or a mixture thereof;

N is a mixture of R' and R" in a molar ration of M:R':R" of $[1-(e+g)]$:e:g;

R' is $R_f$—$A_d$—B—;

$R_f$ is a fully fluorinated straight or branched aliphatic radical which can be interrupted by at least one oxygen atom; A is a divalent radical selected from the group consisting of —$SO_2N(R)$—, —$CON(R)$—, —S—, and —$SO_2$— wherein R is H or a $C_1$ to $C_6$ alkyl radical;

d is 0 or 1;

B is a divalent linear hydrocarbon radical —$C_nH_{2n}$— optionally endcapped by —$(O$—$CH_2$—$CH_2)_z$—, —$(O$—$CH_2$—$CH(CH_3))_z$ or —$(O$—$CH_2$—$CH(CH_2C_1))_z$— wherein n is 2 to 12 and z is 0 to 50;

R" is either a $C_1$ to $C_{30}$ alkyl group or a polysiloxane group of formula III

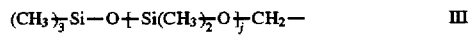

wherein j is 5 to 20;

e is 0.1 to 1.0;

g is 0 to 0.5;

h is 3 to 1000; and k is 3 to 1000.

The present invention further comprises a process for providing soil resistance and resistance to staining by acid dyes to fibers and textiles comprising separate sequential application in any order by exhaustion of an effective amount of the sulfonated phenol-formaldehyde condensation product and copolymer having units of formula II as described above.

The present invention further comprises a fiber or textile treated according to the above processes.

The present invention further comprises a fiber or textile having deposited thereon the sulfonated phenol-formaldehyde condensation product and copolymer having units of formula II as described above.

DETAILED DESCRIPTION OF THE INVENTION

This invention is directed to a process for the simultaneous or sequential treatment of fibers or textiles with the partial fluoroesters or fluorothioesters of maleic acid copolymers, described below and sulfonated aromatic condensates as described by Fitzgerald et al. in U.S. Pat. No. 4,883,839 and U.S. Pat. No. 4,948,650 to provide durable protection from soiling (due to the partial fluoroester or fluorothioester) and staining (due to the sulfonated aromatic condensate) to fibers and textiles, in particular to polyamide carpets, upholstery and other natural fibers such as wool or silk in a single application treatment. The use of the sulfonated aromatic condensates further enhances the stain resist durability towards washing and shampooing.

The partial esters or thioesters of formula II detailed below are formed from copolymers of maleic anhydride and perfluoroalkyl alcohols or perfluoroalkyl thiols of formula I

  (I)

wherein U is O or S, and $R_f$ is a fully fluorinated straight or branched aliphatic radical which can be interrupted by oxygen atoms. Preferably, $R_f$ contains at least 1 and not more than 30 carbon atoms, most preferably $R_f$ contains at least 4 and not more than 16 carbon atoms, A is a divalent radical selected from $—SO_2N(R)—$, $—CON(R)—$, $—S—$, or $—SO_2—$, where R is H or a $C_{1-6}$ alkyl radical, d is zero or 1, and B is a divalent linear hydrocarbon radical $—C_nH_{2n}—$ which can be optionally end-capped by $—(O—CH_2—CH_2)_z—$, $—(O—CH_2—CH(CH_3))_z—$, $—(O—CH_2—CH(CH_2C_1))_z—$, where n is 2 to 12 and preferably 2, and z is 0 to 50 and preferably 1 to 15.

Representative fluoroaliphatic alcohols and fluoroaliphatic thiols that can be used in the esterification with maleic anhydride polymers are, wherein U is as previously defined:

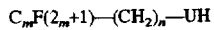

where m is 3 to 14 and n is 2 to 12;

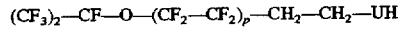

where p is 1 to 5;

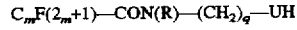

where R is H or a $C_{1-6}$ alkyl radical, q is 1 to 12, and m is 3 to 14; and

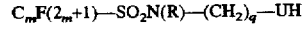

where R, m, and q are as described above.

The composition of the partial ester copolymers used in this invention is shown by the following schematic formula, which shows the structure of the monomer units in the copolymer, but not their sequence:

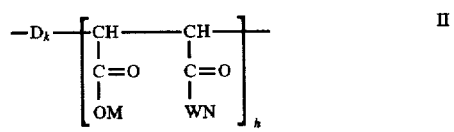  II wherein

D is a vinyl monomer selected from the group styrene, vinyl ether, or alpha olefin;

M is H, alkali metal or ammonium cation;

W is O or S, or a mixture of O and S; and

N is a mixture of R' and R" in a molar ratio of M:R':R" of [1—(e+g)]:e:g,

R' is $R_f$—(A)$_d$—B—;

$R_f$ is a fully fluorinated straight or branched aliphatic radical which can be interrupted by at least one oxygen atom; A is a divalent radical selected from the group consisting of $—SO_2N(R)—$, $—CON(R)—$, $—S—$, and $—SO_2—$ wherein R is H or a $C_1$ to $C_6$ alkyl radical;

d is 0 or 1;

B is a divalent linear hydrocarbon radical $—C_nH_{2n}—$ optionally endcapped by $—(O—CH_2—CH_2)_z—$, $—(O—CH_2—CH(CH_3))_z$ or $—(O—CH_2—CH(CH_2C_1))_z—$ wherein n is 2 to 12 and z is 0 to 50;

R" is either a $C_1$ to $C_{30}$ alkyl group and preferably $C_8$ to $C_{30}$ or a polysiloxane group of Formula III,

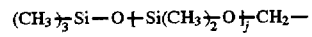  III wherein j is 5 to 20 and preferably 10 to 16, e is 0.1 to 1.0, preferably 0.2 to 0.6, g is 0 to 0.5, preferably 0 to 0.3, h is 3 to 1000, preferably 5 to 30, and k is 3 to 1000, preferably 5 to 30.

The maleic anhydride copolymers are prepared from maleic anhydride, with one or more monomers selected from the group consisting of alpha-olefins, dienes, aromatic olefins, and alkyl vinyl ethers. The number average molecular weight (Mn) of the copolymers can range between 500 to 200,000 and preferably 1,500 to 5,000. Chain transfer agents such as toluene, xylene, ethylbenzene, cumene, methylene chloride, chloroform, carbon tetrachloride, carbon tetrabromide, ethylene dichloride, or hydrocarbon mercaptans can be used to control the molecular weight of the polymers.

Formation of the the partial esters or thioesters used in this invention are limited to 1 mole or less of ester or thioester group per mole of maleic anhydride by limiting the amount of fluoroalcohol or fluorothiol accordingly. Preferably less than 0.65 mole of fluoroalcohol or fluorothiol per mole of maleic anhydride is used to yield less than 0.65 mole of ester or thioester per mole of maleic anhydride. More preferably 0.05–0.3 moles of fluoroalcohol or fluorothiol per mole of maleic anhydride, is used to yield 0.05–0.3 mole of ester or thioester per mole of maleic anhydride. The partial esters or thioesters may be applied to the nylon, silk or wool fibers from aqueous acidic solutions in a one-step application.

Esterifications of maleic anhydride polymers with perfluoroalkyl alcohols or perfluoroalkyl thiols of the type $R_f$—(A)$_d$—B—UH wherein U is O or S require the presence of esterification catalysts, such as triethylamine, p-toluenesulfonic acid, and others generally known in the art. Limiting the ester formation to 1 mole or less (a maximum of one mole) per mole of maleic anhydride, allows for sufficient residual carboxylic groups necessary for solubility and bonding to the substrate. A part of the perfluoroalkyl alcohols or perfluoroalkyl thiols can be replaced by hydrocarbon or siloxane alcohols or thiols. The resulting compounds can easily be converted to water soluble products under mild alkaline conditions.

The partial fluoroesters or fluorothioesters of maleic acid copolymers and sulfonated aromatic condensates can be applied to fibers and textiles in various ways, simultaneously or sequentially, depending on the availability of specific application equipment. Preferably, both are applied by exhaustion. If sequential, the partial fluoroester or fluorothioester may be applied before or after the sulfonated aromatic condensate. Simultaneous application as a mixture is preferred. Bath concentrations are adjusted to provide the application concentrations for the partial fluoroester or fluorothioester and sulfonated aromatic condensate in the ratios as described below, based on weight of fiber. The application or applications may be made to dyed, pigmented, or undyed fiber or textile substrates.

The sulfonated aromatic condensates useful as components in this invention are based on partially sulfonated low molecular weight condensation products of formaldehyde with bis(hydroxyphenyl) sulfone and/or naphthalene. Such materials are commercially available as "Dyapol™" SB—40 (from Yorkshire Chemicals, Greenville S.C.), "Erional™" PA, "Erional™" RN, and "Erional™" LY (from Ciba-Geigy Corporation, Greensboro N.C.), "Intratex™" N (from Crompton & Knowles, Rumford R.I.), "Mesitol™" NBS (from Bayer, Pittsburgh Pa.), "Pomoco™" SR 142 (from Piedmont Chemical Industries, High Point N.C.), and "Stainfree™" (from Sybron Chemicals, Wellford S.C.). All such materials listed above are described as sulfonated aromatic condensates.

Blends of sulfonated aromatic condensates with polycarboxylic acid stain resists are commercially available as "FX—657™" and "FC—66™" (from Minnesota Mining and Manufacturing Co., St. Paul Minn.) and "SR—300™" (a stain resit formulation prepared according to U.S. Pat. Nos. 4,883,839 and 4,948,650, from E. I. du Pont de Nemours and Company, Wilmington, Del.). The preceding commercial suppliers are provided as examples, other sources are well known to those skilled in the art.

In general the amount of sulfonated aromatic condensates may constitute from about 5% to about 80% by weight of the composition being applied, with the remaining 20% to 95% being the partial fluoroester or fluorothioester of maleic acid polymer of formula II, such that the percentage of the two components total to about 100%. Preferably, the amount of sulfonated aromatic condensate ranges between 10% to 40% by weight of the composition, and from about 60% to about 90% by weight of the composition is the partial esters of formula II.

The partial esters and sulfonates aromatic condensates are applied onto textiles and carpets by various methods well know in the art, such as by exhaust from an acidic aqueous bath as practiced in the Beck dyeing of carpets or by addition to an aqueous dye bath solution and exhaustion concurrently with the dye. They may also be applied during continuous dyeing such as with "Kuster" or "Otting" carpet dyeing equipment. Other suitable methods include, but are not limited to, padding, foam, or spray application. In an additional embodiment, aqueous solutions of the fluoroalkyl maleic acid copolymer partial esters or thioesters and sulfonated aromatic condensates can be co-applied with other commercial polycarboxylic stain resists based on methacrylic acid or maleic acid. Such co-application can use mixtures containing 20% to 95% and preferably 60% to 90% of the composition of fluoroalkyl maleic acid copolymer partial esters or thioesters and condensation product.

The quantities of the partial esters and sulfonated aromatic condensates that are applied to the polyamide, wool or silk fiber or fabric are amounts effective in imparting stain and soil resistance. Such concentrations can be readily determined by those skilled in the art by using test methods which are well-known in the art, such as those set forth hereinbelow. For example, the combination of the stain and soil resists can be applied at a concentration in the range between 0.1 and 5.0% based on the weight of fiber or fabric (owf), preferably between 0.3 and 2.0% owf.

The pH of the application bath or baths for the partial fluoroesters or fluorothioesters and sulfonated aromatic condensates, applied simultaneously or sequentially, can range between 1.5 and 9. However, a pH range equal to or less than 4 is required for exhausting the partial esters or thioesters onto the substrate. A lower pH of 2 to 3 is preferred. A surfactant is required for applications below pH 3 to provide for homogenous, stable aqueous bath solutions. The required amount of surfactant can be determined by one skilled in the art by observing the aqueous system in which it is used. Usually an amount of 10 to 100%, and preferably 20 to 50%, surfactant based on the amount of active ingredients of the stain/soil resists will be sufficient to retain homogenous bath solutions. Surfactants which can be used for this application include alpha-olefin sulfonates such as "Witconate" AOS (Witco Corporation, Greenwich Conn.), "Calsoft" (Pilot Chemical Co., Avenel N.J.), sodium lauryl sulfonate such as "Duponol" (Witco Corporation), and alkylated disulfonated diphenyl oxide such as "Dowfax" (Pilot Chemical Co.) and "Calfax" (Cytec Industries, Stamford Conn.). Mono- or polyvalent electrolytes, such as sodium sulfate and magnesium nitrate or sulfate may be added in amounts of 0.01 to 1% on the weight of the bath to improve the exhaust of the stain/soil resists.

Exhaust or fixation of the stain/soil resists can be accomplished at bath or solution temperatures ranging from 20° to 100° C. over a period of a few seconds to one hour, preferably 50° to 85° C. for 5 seconds to 5 minutes. Often the thus treated fiber or fabric is steamed and/or heat treated to allow for optimum performance. The herein described stain/soil resists can also be applied directly via a finish during fiber spinning, twisting or heat setting operation. The stain/soil resists of this invention can also be applied in situ, between pH 2 to 10, to polyamide, polyester, polyolefin, or wool carpeting which has already been installed in a dwelling place, office or other location. They can be applied as a simple aqueous preparation or in the form of aqueous shampoo preparation, with or without one or more polyfluoroorganic oil-, water-, and/or soil- repellent materials.

In the preferred simultaneous application, the application bath contains both the partial fluoroester or fluorothioester and the sulfonated aromatic condensate in the concentration ratio desired. The bath pH and temperature are as described above for the partial fluoroester or fluorothioester application. The quantities of the mixed partial esters and sulfonated aromatic condensate that are applied to the polyamide, wool or silk fiber or fabric are amounts effective in imparting stain and soil resistance. Such concentrations can be readily determined by those skilled in the art by using test methods which are well-known in the art, such as those set forth hereinbelow.

APPLICATION AND TEST METHODS

Evaluation Method I

A white cut-pile carpet (5 g) constructed from 29 oz./square yard Superba-set BCF nylon 6/6 was treated in a laboratory Beck-type apparatus for 10 minutes at 80° C. at a 20:1 liquor-to-goods ratio with a solution of a stain resist agent (stain resist agents are described in the examples) at a pH of 2 to give an application load of 0.8% of weight fiber (owf) based on active ingredients. To the bath was occasionally added 2.0 g per liter of "Magnaflo" (TM, an aqueous solution of magnesium nitrate, from Sybron Chemicals, Wellford, S.C.) A surfactant (0.02 g) such as "Dowfax" (TM) 2A-4 or "Witconate" (TM) AOS was added before pH adjustment. The carpet was then rinsed under tap water, partially de-watered by squeezing and dried in an forced-air oven for about 20 minutes at 121° C. (250°F.).

Evaluation Method II

Treatment baths containing the proper amount of stain resist, surfactants ("Witconate" AOS) and "Magnaflo" (2 g/liter) were adjusted at ambient temperature with dilute sulfamic acid (10%) to a pH of 2.0. The baths were applied onto carpet at 350% wet-pick-up on a continuous dye range using a Kusters Flex-Nip followed by heating in a vertical saturated cloud steamer for approximately 2 minutes. The carpet was then washed, vacuum extracted and dried for approximately fifteen minutes at 120° C. in a horizontal electrical tenter frame. Carpets treated with Control C stain resist were topically sprayed with a commercial antisoilent prior to drying to give approximately 500 ppm of fluorine on weight of carpet. Finally, a commercially available latex composition (Textile Rubber Co., Calhoun, Ga.) was applied as a carpet adhesive to a secondary polypropylene backing ("Ationbac", AMOCO, Atlanta, Ga.).

Stain Test I

A carpet specimen (1.5×3.5 inch) was placed pile up on a flat non-absorbent surface. Ten ml of an aqueous red dye solution (0.1 g Red Dye No. 40 and 3.2 g citric acid in a volume of 1 liter) was poured into a 1-inch diameter cylinder which was tightly placed over the specimen. The cylinder was removed after all the liquid had been absorbed. The stained carpet specimen was left undisturbed for 2 hours, after which it was rinsed thoroughly under cold tap water and squeezed dry. The color of the specimen was measured with a Minolta Chroma Meter CR 200 (Minolta Corp., Ramsey, N.J.) by determining the color difference "Delta a" between unstained and stained carpet samples. This method provides a highly accurate way to measure the degree of red stain of the carpet. The higher the "Delta a", the redder the stain. Results for control and example stain tests by this procedure are shown in Tables 1 and 2 below.

Stain Test II (AATTC 175-1991)

Acid dye stain resistance was evaluated using a procedure based on the American Association of Textile Chemists and Colorists (AATCC) Method 175-1991."Stain Resistance: Pile Floor Coverings". A staining solution was prepared by mixing 0.2 g of FD&C Red No. 40 and 3.2 g of citric acid in one liter of deionized water. The carpet sample to be tested was placed on a flat non-absorbent surface and a hollow plastic cylinder having a 3-inch diameter was placed tightly over the carpet sample. Twenty ml of staining solution was poured into the cylinder and the solution was allowed to absorb completely into the carpet sample. The cylinder was then removed and the stained carpet sample was allowed to sit undisturbed for 24 hours, after which it was rinsed thoroughly under cold tap water and squeezed dry.

The carpet sample was then visually inspected and rated for staining according to AATCC Red 40 Stain Scale. A stain rating of 10 is excellent, showing outstanding stain resistance, whereas 1 is the poorest rating, comparable to an untreated control sample. Results for control and example stain tests by this procedure, before and after the Shampoo Test, are shown in Tables 3 and 4 below.

For this test method, a meaningful comparison of the control samples (treated with maleic acid copolymer) with the Examples of this invention (treated with the partial fluoroesters or fluorothioesters of the maleic acid copolymers) necessitates making a spray application of any commercial fluorinated antisoilent to the carpet samples treated only with the sulfonated aromatic condensates. Control samples so treated are identified in Tables 3 and 4.

Shampoo Test (Wash Durability)

The carpet specimen was submerged for 5 minutes at room temperature in a detergent solution of dodecyl sodium sulfate in water consisting of Duponol WAQE (1.5 g per liter) and adjusted with dilute sodium carbonate to a pH of 10. The specimen was then removed, rinsed thoroughly under tap water, de-watered by squeezing and air-dried. The dry carpet specimen was then tested according to "Stain Test II" as described above. Results for untreated, control, and example shampoo tests by this procedure are shown in Tables 3 and 4 below.

Accelerated Soil Test (Drum Test)

Carpet specimens (1.5×3.5 inch) were mounted pile up with a 2-sided adhesive tape onto the inside of a metal drum (8 inch diameter) until the inside surface was completely covered by carpet. Into the drum was then placed the volume of 250 ml of dirty SURLYN ionomer resin pellets, made by blending 1-liter volume SURLYN 8528 ionomer resin (from DuPont, Wilmington, Del.) pellets with 20 g of synthetic soil (AATCC Method 123-1988), and 250 ml volume of 5/16 inch ball bearings. The drum was then closed and rolled on a roller-type drum mill for 3 minutes. The carpet samples were then removed from the drum and cleaned with a canister-type vacuum cleaner.

The degree of soiling was measured with a Minalto Chroma Meter CR 200 (Minolta Corp., Ramsey, N.J.) by determining the difference in darkness as "Delta E" between the unsoiled control and the soiled carpet sample. The higher the "Delta E", the darker the sample. Differences of two "Delta E" units are visually distinguishable. Results for untreated, control, and example soil tests by this procedure are shown in Table 1 below.

Dry Soiling Test

Treated and untreated carpet samples were exposed simultaneously to floor traffic for up to 100,000 footsteps. They were then removed from the floor and vacuumed. The degree of soiling was measured with a Minolta Chroma Meter CR 200 (Minolta Corp., Ramsey, N.J.) by determining the difference in darkness as "Delta E" between the unsoiled control and the soiled carpet sample. The higher the "Delta E", the darker the sample. Differences of two "Delta E" units are visually distinguishable. Results for untreated, control, and example soil tests by this procedure at 49,000 (49M), 57,000 (57M), and 100,000 (100M) footsteps are shown in Table 4 below.

For this test method, a meaningful comparison of the control samples (treated with maleic acid copolymer) with the Examples of this invention (treated with the partial fluoroesters or fluorothioesters of the maleic acid copolymers) necessitates making a spray application of any commercial fluorinated antisoilent to the carpet samples treated only with the sulfonated aromatic condensates. Control samples so treated are identified in Tables 3 and 4.

UV Lightfastness Test

Colorfastness to UV light was measured according to AATCC Test Method 16E-1987. The specimen was rated after exposure to 80 AATCC Fading Units (AFU) with the Gray Scale for color change. A rating of 5 indicates no color change whereas a severe color change is indicated by a 1 rating. Results for untreated, control, and example soil tests by this procedure are shown in Table 3 below.

For this test method, a meaningful comparison of the control samples (treated with maleic acid copolymer) with the Examples of this invention (treated with the partial fluoroesters or fluorothioesters of the maleic acid copolymers) necessitates making a spray application of any commercial fluorinated antisoilent to the carpet samples treated only with the sulfonated aromatic condensates. Control samples so treated are identified in Tables 3 and 4.

Oil Repellency Test

The oil repellency was measured according to AATCC Standard Test 188-1978, which is based on the resistance of treated fiber or fabric to penetration of oils of varying surface tensions at a scale of 0 to 8. A rating of 8 is given to the least oil penetrating (most oil repellent) surface. Results for untreated, control, and example soil tests by this procedure are shown in Tables 1 and 2 below.

Water Repellency Test

The water repellency was measured according to DuPont TEFLON (Wilmington, Del.) Standard Test Method #311.56. After proper conditioning, the fabric is placed on a flat level surface. Three drops of the selected water/ isopropanol mixture are placed on the fabric and left for 10 seconds. If no penetration has occurred, the fabric is judged to "pass" this level of repellency and the next higher numbered test liquid is tested. The fabric rating is the highest numbered test liquid that does not wet the fabric.

The water/isopropanol mixtures have the following compositions:

| DuPont Water Repellency Rating | Composition (wt %) | |
| --- | --- | --- |
| Number | Water | Isopropanol |
| 1 | 98 | 2 |
| 2 | 95 | 5 |
| 3 | 90 | 10 |
| 4 | 80 | 20 |
| 5 | 70 | 30 |
| 6 | 60 | 40 |

A rating of 0 indicates no water repellency, a rating of 6 indicates maximum water repellency. Results for untreated, control, and example soil tests by this procedure are shown in Tables 1 and 2 below.

Compounds Used

Polymer I (1-Octene/Maleic Anhydride Copolymer)

A solution of 220.5 g (2.25 moles) of maleic anhydride, 177 g (1.58 moles) of 1-octene and 5 g of dodecylmercaptan in 400 g of methyl isobutyl ketone was heated under agitation and nitrogen to 95° C. T-Butyl peroctoate initiator (15 ml) was added via a syringe pump over a 6 hour period. After holding the temperature for 20 hours at 95° C., another portion of initiator (2 ml) was added. The product (hereinafter called "Polymer I") was cooled and discharged after gas chromatographic (GC) analysis indicated completion of reaction. A small amount (22.5 g) of the product was stripped to dryness at 80°–85° C. under reduced pressure (13–20 Pa) to give a brittle, amber resin having a $\overline{M}n$ value of 2150 and a ratio of $MW/\overline{Mn}$ of 2.15 by gel permeation chromatography (polystyrene standard).

CONTROL EXAMPLES

Table 1 shows a comparison of conventional non-fluorinated stain resists versus the fluorinated stain resists used in the present invention. Table 2 shows the performance of non-fluorinated stain resists versus the stain resists used in the present invention having progressively higher levels of fluoroester. Tables 3 and 4 show the performance of Example 2 versus conventional processing wherein the stain resist and soil resist are applied in separate steps.

Control A

An isobutylene/maleic anhydride copolymer (25 g) having a molecular weight of 5,000 to 8,000,commercially available as "Isobam™" 600 from Kuraray Co. (Japan), was hydrolyzed by adding it to a solution of 6.5 g of sodium hydroxide in 68.5 g of deionized water. The mixture was agitated at 70° C. until all the polymer had dissolved to a clear solution containing 25% of active ingredients.

Control B

A solution of 29.4 g (0.3 mole) of maleic anhydride, 24.2 g (0.216 mole) of 1-octene and 0.6 g of 1-dodecanethiol in 75 g of methyl isobutyl ketone was heated under agitation and nitrogen to 95° C. T-Butyl peroctoate (6 ml) initiator was added over a 3 hour period via a syringe pump. No maleic anhydride was detected by GC analysis after 21 hours. The resulting polymer (57 g) was then isolated by removing the volatiles at 80°–90° C. under reduced pressure (10–20 Pa). The amber, brittle resin melted at 115°–125° C. and had a number average molecular weight of 1736 and a ratio of $MW/\overline{Mn}$ of 1.95 by gel permeation chromatography (polystyrene standard).

A part of the above polymer (25 g) was hydrolyzed at 85° C. with 30% sodium hydroxide (12 g) in 63 g of deionized water to give a clear aqueous solution containing 25% of active ingredients.

Control C

A styrene/maleic anhydride copolymer (25 g), commercially available as SMA Resin 1000 from Elf Atochem North America, Philadelphia, PA, was dissolved by heating at 70°–80° C. in a solution of 4.2 g of sodium hydroxide in 70.8 g of deionized water for 6 hours. The resulting clear solution contained 25% of active ingredients.

Control D

A solution of 19.6 g (0.2 mole) of maleic anhydride and 20 g (0.2 mole) of n-butyl vinyl ether in 120 g of cumene was heated under agitation and nitrogen to 70° C. "Vazo™" 67 initiator (0.6 g, 2,2'-azobis(2-methylbutyronitrile) (from DuPont, Wilmington DE) in 10 g of cumene was added within 2 hours via a syringe pump to this solution. The temperature during the addition reached 85° C. and an insoluble material started to form. The reaction mass was agitated at 70° C. for another 20 hours before being poured into 300 ml of methanol. A white solid (40.5 g) was separated by filtration and dried in a vacuum oven at 80° C. This brittle polymer melted between 160°–175° C. and had a number average molecular weight of 9,893 and a ratio of MW/M̄n of 1.33 by gel permeation chromatography (polystyrene standard).

A part of the polymer (16.4 g) was dissolved in 45 g of methyl isobutyl ketone at 75° C. Sodium hydroxide (10.7 g of a 30% solution) in 60 ml of deionized water were added to the agitated solution. After heating for 3 hours at 75° C., the methyl isobutyl ketone was removed at reduced pressure (40–80 Pa) to give a slightly hazy aqueous solution containing 14% of active ingredients.

Control E

"Polymer I" (22.5 g) was hydrolyzed by heating under agitation for 3 hours at 75° C. with a solution of 30% sodium hydroxide (9.5 g) in 95 g of deionized water. The methyl isobutyl ketone was removed at reduced pressure (200–300 Pa). Finally the active ingredients concentration of the clear, amber solution was adjusted to 16% with deionized water.

EXAMPLES

Table 1 compares the performance of Examples 1 through 4 as stain resist agents versus Control Examples A through D. Table 2 compares the performance of Examples 5 through 11 versus Control Example E. Tables 3 and 4 compare the performance of Example 2 versus Control Example C.

Example 1

An isobutylene/maleic anhydride copolymer (25.8 g—containing ca. 16.4 g maleic anhydride, equivalent to 0.167 mole) having a molecular weight of 5,000–8,000 and commercially available as "Isobam™" 600 from Kuraray Co. (Japan) was dissolved at 85° C. in 70 g of dimethyl sulfoxide. To the solution was then added 2.9 g of mixed fluoroalcohols of the formula $F-(CF_2-CF_2)_s-CH_2-CH_2-OH$, where s is predominately 3, 4, and 5, with an apparent molecular weight of 488. The reaction mass was agitated for 65 hours at 85° C. after the addition of 0.2 g p-toluenesulfonic acid catalyst. The solution was then poured into an acetone/water mixture to precipitate the polymer. The crude polymer was further purified by washing with an acetone/water mixture, and dried under vacuum (20 Pa) at 65° C. giving a brittle resin melting between 290 and 295° C. and containing 4.2% of fluorine. This would indicate that 59% of the fluoroalcohol was incorporated in the polymer. The above resin (8 g) was then reacted at 65° C. with a solution of 30% sodium hydroxide (5 g) in 19 g of deionized water to give a turbid, amber solution. Filtration gave a clear solution containing approximately 24% of active ingredients and 0.22% of fluorine. Performance of this compound as a stain resist agent is shown in Table 1.

Example 2

1-octene/maleic anhydride copolymer (25 g) as described in Control B (containing 12 g of maleic anhydride equivalent to 0.1229 mole) was dissolved at 75° C. in 50 g of methyl isobutyl ketone. To the solution was added 5.2 g (0.0112 mole) of a mixture of fluoroalcohols of the formula $F-(CF_2-CF_2)_s-CH_2-CH_2-OH$ where s is predominately 3,4,5, and having an apparent molecular weight of 463. The esterification was catalyzed by the addition of 0.1 ml of triethylamine. After heating for 20 hours at 75° C. a solution of 30% sodium hydroxide (12 g) in 100 g of deionized water was added and heating was continued at 60° C. for 4 hours. The accompanying methyl isobutyl ketone was then removed at reduced pressure (40–80 Pa) to give a clear aqueous solution containing 21.6% of active ingredients and 2.3% of fluorine. This indicates that about 4.5 g (86%) of the fluoroalcohol is incorporated. Performance of this compound as a stain resist agent is shown in Tables 1, 3, and 4.

Example 3

Styrene/maleic anhydride resin (25 g, containing 11 g maleic anhydride equivalent to 0.112 mole), commercially available as SMA resin 1000 (from Elf Atochem North America, Philadelphia, Pa.) was dissolved in 50 g of methyl isobutyl ketone at 75° C. To the clear solution was added 5.2 g (0.0112 mole) of a mixture of fluoroalcohols of the formula $F-(CF_2-CF_2)_s-CH_2-CH_2-OH$ where s is predominately 3, 4, and 5 and having an apparent molecular weight of 463. The esterification was catalyzed by the addition of 0.1 ml of triethylamine. A solution of 30% sodium hydroxide (12 g) in 100 g of deionized water was added to the reaction product after 24 hours and agitation was continued at 65° C. for 3 hours. The accompanying methyl isobutyl ketone was then removed at 60° C. under reduced pressure (40–80 Pa) to give a slightly hazy aqueous solution containing 18.7% of active ingredients and 1.7% of fluorine. This indicates that only 3.8 g (73%) of fluoroalcohol was incorporated. Performance of this compound as a stain resist agent is shown in Table 1.

Example 4

N-butyl vinyl ether/maleic anhydride copolymer (23.1 g, containing 11.1 g maleic anhydride equivalent to 0.113 mole) as described in Control D was dissolved in 59.6 g of methyl isobutyl ketone at 75° C. To this solution was added 5.2 g (0.0113 mole) of a mixture of fluoroalcohols of the formula $F-(CF_2-CF_2)_s-CH_2-CH_2-OH$ where s is predominately 3, 4, and 5 and having an apparent molecular weight of 463. The esterification was catalyzed by the addition of 0.15 ml of triethylamine. To the reaction product was added after 25 hours a solution of 30% sodium hydroxide (12 g) in 80 g of deionized water and agitation was continued at 65° C. for 4 hours. The accompanying methyl isobutyl ketone was then removed at 60° C. under reduced pressure (40–80 Pa) to give a hazy aqueous solution containing 10.8% of active ingredients and 1.2% of fluorine. This indicates that 4.4 g (85%) of the fluoroalcohol was incorporated. Performance of this compound as a stain resist agent is shown in Table 1.

Example 5

To a reaction vessel equipped with a reflux condenser, a mechanical stirrer, a thermometer, and with a nitrogen inlet, were charged 90 g of "Polymer I" (containing 24.14 g maleic anhydride equivalent to 0.246 mole), 11.4 g (0.0246 mole) of 1H,1H,2H,2H-perfluorodecanol and 10 g of dry methyl isobutyl ketone. The mixture was heated to 75° C. under agitation and nitrogen. To the clear amber solution was added 0.1 ml of triethylamine catalyst. The conversion to ester was monitored by GC analysis of precipitated samples from "Freon™" 113 (1,1,2-trichlorotrifluoroethane from DuPont, Wilmington Del.)/cyclohexane (3:1). Four hours later another portion of catalyst was added (0.05 ml). After 21 hours GC analysis indicated 7.6% of residual 1H,1H,2H, 2H-perfluorodecanol. The reaction product was cooled and 15.3 g was stripped at 80°–85° C. and 13–20 Pa to dryness giving 8.1 g of an amber, brittle resin with a melting point range of 140°–153° C. and containing 12.6% of fluorine.

The remaining product (81.8 g) was reacted with a solution of 30% sodium hydroxide (14.3 g) in 95 g deionized water at 60° C. for 3 hours. The methyl isobutyl ketone was then removed at reduced pressure (40–80 Pa) giving after further dilution with deionized water a clear, amber solution (301.5 g, pH 5.4) containing 14.2% active ingredients and 1.6% of fluorine (found by analysis). This corresponds to approximately 0.092 mole of 1H,1H,2H,2H-perfluorodecanol per mole of maleic anhydride. Performance of this compound as a stain resist agent is shown in Table 2.

Example 6

"Polymer I" (90 g, containing 24.14 g maleic anhydride equivalent to 0.246 mole) was reacted with 17.1 g (0.0369 mole) of 1H,1H,2H,2H-perfluorodecanol in 10 g of methyl isobutyl ketone in a similar manner as described in Example 5 after the addition of 0.3 ml of triethylamine. After heating for 44 hours at 75° C., GC analysis indicated 6.7% residual 1H,1H,2H,2H-perfluorodecanol. A part of the product (41.6 g) was stripped to dryness resulting in an amber, brittle resin (23.0 g) having a melting range of 137°–147° C. and containing 18.2% of fluorine.

The major portion of the product (63.6 g) was heated at 60° C. with 30% sodium hydroxide (17.2 g) in 100 g of deionized water. The accompanying methyl isobutyl ketone solvent was then removed at reduced pressure (40–80 Pa) and the concentration of the active ingredients adjusted to 25%, resulting in a clear, amber solution of pH 6.9 containing 4.4% of fluorine (found by analysis). This corresponds to 0.14 mole of 1H,1H,2H,2H-perfluorodecanol per mole of maleic anhydride. Performance of this compound as a stain resist agent is shown in Table 2.

Example 7

"Polymer I" (90 g, containing 24.14 g maleic anhydride equivalent to 0.246 mole) was reacted with 22.8 g (0.049 mole) of 1H,1H,2H,2H-perfluorodecanol in 10 g methyl isobutyl ketone in the presence of 0.25 ml of triethylamine in similar fashion as described in Example 5. GC analysis after 45 hours indicated 9.7% of residual 1H,1H,2H,2H-perfluorodecanol. A part of the product (23.1 g) was stripped to dryness at reduced pressure (13–20 Pa) resulting in an amber, brittle resin (13.3 g) melting between 137°–147° C. and containing 21.2% of fluorine. The major part of the product (83.3 g) was heated for 3 hours at 60° C. with a solution of 30% sodium hydroxide (21.5 g) in 100 g of deionized water. After the removal of the accompanying methyl isobutyl ketone at reduced pressure (40–80 Pa) the concentration of the resulting clear, amber solution was adjusted to 25% active ingredients. The fluorine concentration was found to be 4.9%. This corresponds to 0.18 mole of 1H,1H,2H,2H-perfluorodecanol per mole of maleic anhydride. Performance of this compound as a stain resist agent is shown in Table 2.

Example 8

"Polymer I" (90 g, containing 24.14 g maleic anhydride equivalent to 0.246 mole) was reacted with 45.6 g (0.0984 mole) of 1H,1H,2H,2H-perfluorodecanol in 10 g of methyl isobutyl ketone in the presence of 0.8 ml of triethylamine in a similar fashion as described in Example 5. GC analysis after 67 hours indicated 9.2% of residual 1H,1H,2H,2H-perfluorodecanol. A part of the product (36.7 g) was stripped to dryness under reduced pressure (13–20 Pa) resulting in an amber, brittle resin (23.5 g), melting between 133°–144° C. and containing 33.9% of fluorine. The major part of the product (94.2 g) was heated for 3 hours at 60° C. with a solution of 30% sodium hydroxide (17.8 g) in 100 g of deionized water. A hazy, viscous solution resulted after the removal of the accompanying methyl isobutyl ketone at reduced pressure (40–80 Pa). After standing overnight at room temperature a small amount of an insoluble material (1.5 g) had separated at the bottom of the reaction vessel above a clear, amber solution containing approximately 16% of active ingredients. The fluorine concentration was found to be 5.2%. This corresponds to 0.36 mole of 1H,1H,2H,2H-perfluorodecanol per mole of maleic anhydride. Performance of this compound as a stain resist agent is shown in Table 2.

Example 9

"Polymer I" (45 g, containing 12.07 g maleic anhydride equivalent to 0.123 mole) was reacted with 45.6 g (0.0984 mole) of 1H,1H,2H,2H-perfluorodecanol in 15 g of methyl isobutyl ketone in the presence of 0.6 ml of triethylamine in a similar fashion as described in Example 5. GC analysis after 42 hours indicated 22.9% of unreacted 1H,1H,2H,2H-perfluorodecanol. Additional triethylamine catalyst (0.2 ml) only slightly reduced the fluoroalcohol concentration to 21.8% after 66 hours. This seems to indicate that no further esterification took place under these conditions and the reaction was terminated. A part of the product (29.3 g) was stripped to dryness at 80°–85° C. under reduced pressure (13–20 Pa) resulting in an amber, brittle resin melting between 124°–133° C. and containing 42.0% of fluorine. The major part of the product (62.0 g) was reacted for 4 hours at 60° C. with a solution of 30% sodium hydroxide (3.6 g) in 100 g of deionized water. A milky solution resulted after the removal of the accompanying methyl isobutyl ketone at reduced pressure (40–80 Pa). After standing overnight at room temperature considerable solids separated at the bottom of the reaction vessel. Centrifugation of the liquid gave rise to a milky solution containing approximately 4.6% active ingredients. The fluorine concentration was found to be 2.0%. This corresponds to approximately 0.625 mole of 1H,1H,2H,2H-perfluorodecanol per mole of maleic anhydride. Performance of this compound as a stain resist agent is shown in Table 2.

Example 10

"Polymer I" (90 g, containing 24.14 g maleic anhydride equivalent to 0.246 mole) was reacted with 11.4 g of 1H,1H,2H,2H-perfluorodecanol (0.0246 mole), 6.6 g of octadecyl alcohol (0.0246 mole) in 10 g of methyl isobutyl ketone in the presence of 0.4 ml of triethylamine catalyst in similar fashion as described in Example 5. No 1H,1H,2H,2H-perfluorodecanol was detected by GC analysis after 40 hours at 75° C.

A part of the product (36 g) was stripped to dryness at reduced pressure (13–20 Pa) to give an amber, brittle resin (20 g) which melted at between 119°–129° C. and contained 12.4% of fluorine. The major part of the product (74.3 g) was reacted for 3 hours at 60° C. with a solution of 30% sodium hydroxide (18.5 g) in 120 g of deionized water. After removal of the accompanying methyl isobutyl ketone at reduced pressure, the concentration of the resulting clear, amber solution was adjusted to 25% active ingredients. The fluorine content was found to be 3.1%. Performance of this compound as a stain resist agent is shown in Table 2.

Example 11

"Polymer I" (90 g, containing 24.14 g maleic anhydride equivalent to 0.246 mole) was reacted with 11.4 g of 1H,1H,2H,2H-perfluorodecanol (0.0246 mole) and 10.5 g (0.008 mole) of polysiloxane monocarbinol ($\overline{Mn}$ OH=~1310, from Huels America, Piscataway, N.J.) in 10 g of methyl isobutyl ketone in the presence of 0.4 ml of triethylamine catalyst in similar fashion as described in Example 5. No 1H,1H,2H,2H-perfluorodecanol was detected by GC analysis after 23 hours at 75° C. A part of the product (54.4 g) was stripped to dryness at reduced pressure (13–20 Pa) resulting in a amber, brittle resin which melted between 105°–120° C. and contained 14.0% of fluorine and 2.4% of silicon.

The major part of the product (76.4 g) was reacted with 30% sodium hydroxide (16.1 g) in 130 g of deionized water at 60° C. for 4 hours. After removal of the accompanying methyl isobutyl ketone at reduced pressure, the concentration of of the clear, amber solution was adjusted to 25% of active ingredients. The fluorine content was found to be 3.5%.

Performance of this compound as a stain resist agent is shown in Table 2.

Tables 1–4 show the performance of Controls A–E and Examples 1–11 when applied to carpet as blends with various sulfonated aromatic condensates.

TABLES

TABLE 1

Performance of Carpet Treated with Blends of 80% Partial Fluoroesters of Maleic Acid Copolymers and 20% Sulfonated Aromatic Condensates (SAC).

| Formulation (active ingredients) | | Analysis | Oil/Water | Test Results | |
|---|---|---|---|---|---|
| | | | | Stain Test I | Accelerated Soiling Test |
| Example (80%) | SAC (20%) | Fluorine (ppm) | Repellency Values | "Delta a" Value | "Delta E" Value |
| Untreated | None | — | 0/0 | 35.0 | 24.4 |
| Control A | Erional LY | — | 0/0 | 4.6 | 17.2 |
| Example 1 | Erional LY | 130 | 0/1 | 4.5 | 15.1 |
| Control B | Erional LY | — | 0/0 | 1.2 | 14.0 |
| Example 2 | Erional LY | 360 | 0/3 | 0.3 | 11.5 |
| Example 2 | Baygard DT | 360 | 0/3 | 0.2 | 10.4 |
| Control C | Erional LY | — | 0/0 | 1.9 | 14.3 |
| Example 3 | Erional LY | 400 | 0/2 | 2.1 | 12.2 |
| Example 3 | Baygard DT | 300 | 0/2 | 0.8 | 10.7 |
| Control D | Erional LY | — | 0/1 | 2.4 | 14.3 |
| Example 4 | Erional LY | 530 | 0/5 | 1.0 | 12.5 |

TABLE 2

Performance of Carpet Treated with Blends of Partial Fluoroesters of 1-Octene/Maleic Acid Copolymers and Sulfonated Aromatic Condensates (SAC).

| Formulation (active ingredients) | | | | Analysis Fluorine | Oil/Water Repellency | Test Results | |
|---|---|---|---|---|---|---|---|
| | | | | | | Stain Test 1 "Delta a" | Accelerated |
| Example | (%) | SAC | (%) | (ppm) | Values | Value | Soiling Test |
| Untreated | | None | | — | 0/0 | 35.0 | |
| Control E | 100 | None | | — | 0/1 | 1.7 | |
| Control E | 80 | Erional LY | 20 | — | 0/0 | 1.3 | |
| Control E | 60 | Erional LY | 40 | — | 0/0 | 1.8 | |
| Control E | 80 | Baygard DT | 20 | — | 0/0 | 1.0 | |
| Example 5 | 100 | None | | 490 | 0/3 | 3.6 | |
| Example 5 | 80 | Erional LY | 20 | 380 | 0/3 | 1.7 | |
| Example 5 | 60 | Erional LY | 40 | 350 | 0/3 | 2.0 | |
| Example 5 | 80 | Baygard DT | 20 | 300 | 0/0 | 0.3 | |
| Example 6 | 100 | None | | 580 | 0/4 | 5.8 | |
| Example 6 | 80 | Erional LY | 20 | 480 | 0/3 | 0.7 | |
| Example 6 | 60 | Erional LY | 40 | 360 | 0/3 | 0.7 | |
| Example 6 | 80 | Baygard DT | 20 | 420 | 0/2 | 0.7 | |
| Example 7 | 100 | None | | 600 | 0/5 | 10.6 | |
| Example 7 | 80 | Erional LY | 20 | 420 | 0/3 | 1.7 | |
| Example 7 | 60 | Erional LY | 40 | 530 | 0/3 | 1.3 | |
| Example 7 | 80 | Baygard DT | 20 | 600 | 0/3 | 0.7 | |
| Example 8 | 100 | None | | 530 | 0/5 | 34.3* | |
| Example 8 | 80 | Erional LY | 20 | 460 | 0/5 | 2.2 | |
| Example 8 | 60 | Erional LY | 40 | 340 | 0/3 | 3.1 | |
| Example 8 | 80 | Baygard DT | 20 | 420 | 0/2 | 2.7 | |
| Example 9 | 100 | None | | 840 | 1/5 | 28.3* | |
| Example 9 | 80 | Erional LY | 20 | 810 | 0/3 | 5.2 | |
| Example 9 | 60 | Erional LY | 40 | 630 | 0/2 | 1.8 | |
| Example 9 | 80 | Baygard DT | 20 | 470 | 0/2 | 2.1 | |
| Example 10 | 100 | None | | 420 | 0/4 | 7.7 | |

TABLE 2-continued

Performance of Carpet Treated with Blends of Partial Fluoroesters of 1-Octene/Maleic Acid Copolymers and Sulfonated Aromatic Condensates (SAC).

| Example | Formulation (active ingredients) (%) | SAC | (%) | Analysis Fluorine (ppm) | Oil/Water Repellency Values | Stain Test 1 "Delta a" Value | Accelerated Soiling Test |
|---|---|---|---|---|---|---|---|
| Example 10 | 80 | Erional LY | 20 | 250 | 0/3 | 0.8 | |
| Example 10 | 60 | Erional LY | 40 | 170 | 0/2 | 0.4 | |
| Example 10 | 80 | Baygard DT | 20 | 200 | 0/1 | 0.2 | |
| Example 11 | 100 | None | | 430 | 0/4 | 5.7 | |
| Example 11 | 80 | Erional LY | 20 | 350 | 0/3 | 0.6 | |
| Example 11 | 60 | Erional LY | 40 | 280 | 0/2 | 0.6 | |
| Example 11 | 80 | Baygard DT | 20 | 250 | 0/2 | 0.0 | |

*Tip Staining

TABLE 3

Performance of Beige Cut-Pile Carpet* Treated with Blends of 80% Partial Fluoroester of 1-Octene/Maleic Acid Copolymer and 20% Sulfonated Aromatic Condensates (SAC).

| Formulation (active ingredients) | | Active Ingred. | Analysis Fluorine | Stain Resistance (Stain Test II) | | UV Light-fastness |
|---|---|---|---|---|---|---|
| Example (80%) | SAC (20%) | (% owf) | (%) | Initial Value | After Shampoo | (80 hr.) Value |
| Untreated | None | — | — | 1 | 1 | 5 |
| Control C | Erional LY | 0.63 | 618** | 10 | 5 | 4 |
| Example 2 | Erional LY | 0.63 | 283 | 9 | 8 | 4–5 |
| Control C | Erional LY | 1.05 | 517** | 10 | 6 | 4–5 |
| Example 2 | Erional LY | 1.05 | 420 | 9 | 8 | 4–5 |

*40 oz/sq. yd. DuPont "Antron" nylon 1150 bulk-continuous twist, Superba heat set fiber (from DuPont, Wilmington DE).
**Carpet was sprayed with commercial fluorinated antisoilent, see Test Method descriptions.

TABLE 4

Performance of Yellow Level-Loop Carpet* Treated with Blends of 80% Partial Fluoroester of 1-Octene/Maleic Acid Copolymer and 20% Sulfonated Aromatic Condensates (SAC).

| Formulation (active ingredients) | | Active Ingred. | Anal. F | Stain Resistance (Stain Test II) | | Dry Soiling Value Test | | |
|---|---|---|---|---|---|---|---|---|
| Example (80%) | SAC (20%) | (% owf) | (%) | Initial Value | After Shampoo | 49 M | 57 M | 100 M |
| Untreated | None | — | — | 1 | 1 | 20 | 21 | 26 |
| Control C | Erional LY | 0.63 | 429** | 10 | 10 | 16 | 17 | 21 |
| Example 2 | Erional LY | 0.63 | 263 | 9 | 8 | 16 | 17 | 21 |
| Control C | Erional LY | 1.05 | 823** | 10 | 10 | 17 | 18 | 22 |
| Example 2 | Erional LY | 1.05 | 447 | 10 | 9 | 17 | 18 | 22 |

*24 oz/sq. yd. DuPont "Antron" nylon 1245 bulk-continuous 2-ply twisted fiber (DuPont).
**Carpet was sprayed with commercial fluorinated antisoilent, see Test Method descriptions.

What is claimed is:

1. A fiber or textile treated according to a process for providing soil resistance and resistance to staining by acid dyes comprising application of an effective amount of a composition comprising a mixture of 1) a sulfonated phenol-formaldehyde condensation product which is useful as a dye-resist agent, a dye-fixing agent, a dye-reserving agent, or an agent which improves the wet-fastness of dyeings on polyamide fibers, and 2) a copolymer having units of formula II

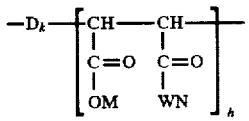
II wherein

D is a vinyl monomer selected from the group consisting of styrene, vinyl ether, and alpha olefin;

M is H, alkali metal or ammonium cation;

W is O, S, or a mixture thereof;

N is a mixture of R' and R" in a molar ratio of M:R':R" of :e:g;

R' is $R_f$—$A_d$—B—;

$R_f$ is a fully fluorinated straight or branched aliphatic radical which can be interrupted by at least one oxygen atom; A is a divalent radical selected from the group consisting of —$SO_2N(R)$—, —$CON(R)$—, —S—, and —$SO_2$— wherein R is H or a $C_1$ to $C_6$ alkyl radical;

d is 0 or 1;

B is a divalent linear hydrocarbon radical —$C_nH_{2n}$— optionally endcapped by —(O—$CH_2$—$CH_2$)$_z$—, —(O—CH2—CH($CH_3$))$_z$ or —(O—$CH_2$—CH($CH_2Cl$))$_z$— wherein n is 2 to 12 and z is 0 to 50;

R" is either a $C_1$ to $C_{30}$ alkyl group or a polysiloxane group of formula III

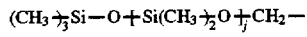
III wherein j is 5 to 20;

e is 0.1 to 1.0;

g is 0 to 0.5;

h is 3 to 1000; and k is 3 to 1000.

2. A fiber or textile having deposited thereon 1) a sulfonated phenol-formaldehyde condensation product which is useful as a dye-resist agent, a dye-fixing agent, a dye-reserving agent, or an agent which improves the wet-fastness of dyeings on polyamide fibers, and 2) a copolymer having units of formula II

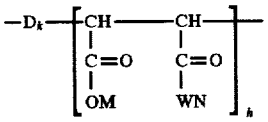
II wherein

D is a vinyl monomer selected from the group consisting of styrene, vinyl ether, and alpha olefin;

M is H, alkali metal or ammonium cation;

W is O, S, or a mixture thereof;

N is a mixture of R' and R" in a molar ratio of M:R':R" of :e:g;

R' is $R_f$—$A_d$—B—;

$R_f$ is a fully fluorinated straight or branched aliphatic radical which can be interrupted by at least one oxygen atom; A is a divalent radical selected from the group consisting of —$SO_2N(R)$—, —$CON(R)$—, —S—, and —SO2— wherein R is H or a $C_1$ to $C_6$ alkyl radical;

d is 0 or 1;

B is a divalent linear hydrocarbon radical —$C_nH_{2n}$— optionally endcapped by —(O—$CH_2$—$CH_2$)$_z$—, —(O—$CH_2$—CH($CH_3$))$_z$ or —(O—$CH_2$—CH($CH_2C_1$))$_z$— wherein n is 2 to 12 and z is 0 to 50;

R" is either a $C_1$ to $C_{30}$ alkyl group or a polysiloxane group of formula III

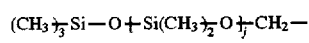
III wherein j is 5 to 20;

e is 0.1 to 1.0;

g is 0 to 0.5;

h is 3 to 1000; and k is 3 to 1000.

3. The fiber or textile of claim 2 having deposited thereon from about 10% to about 40% by weight of the condensation product and from about 60% to about 90% by weight of formula II such that the percentage of the two components total to about 100%.

4. The fiber or textile of claim 2 wherein $R_f$ is an aliphatic radical having from about 1 to about 30 carbon atoms.

5. The fiber or textile of claim 2 wherein for B, n is 2 and z is 1 to 15.

6. The fiber or textile of claim 2 wherein R" is a $C_8$ to $C_{18}$ alkyl group.

7. The fiber or textile of claim 2 wherein R" is a polysiloxane group of formula III wherein j is 5 to 20.

8. The fiber or textile of claim 2 wherein e is 0.2 to 0.6, g is 0 to 0.3, h is 5 to 30 and k is 5 to 30.

9. The fiber or textile of claim 2 having a maximum of one mole of ester or thioester group per mole of maleic anhydride.

10. The fiber or textile of claim 2 wherein the condensation product, the copolymer of formula II, or a mixture thereof is deposited thereon simultaneously with at least one other polycarboxylic stain resist.

11. A fiber or textile treated according to a process for providing soil resistance and resistance to staining by acid dyes comprising the sequential application by exhaustion in any order of an effective amount of 1) a sulphonated phenol-formaldehyde condensation product which is useful as a dye-resist agent, a dye-fixing agent, a dye-reserving agent, or an agent which improves the wet-fastness of dyeings on polyamide fibers, and 2) a copolymer having units of formula II

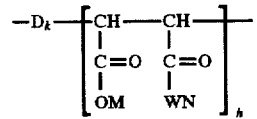
II wherein

D is a vinyl monomer selected from the group consisting of styrene, vinyl ether, and alpha olefin;

M is H, alkali metal or ammonium cation;

W is O, S, or a mixture thereof;

N is a mixture of R' and R" in a molar ratio of M:R':R" of :e:g;

R' is $R_f$—$A_d$—B—;

$R_f$ is a fully fluorinated straight or branched aliphatic radical which can be interrupted by at least one oxygen atom; A is a divalent radical selected from the group consisting of —$SO_2N(R)$—, —$CON(R)$—, —S—, and —$SO_2$— wherein R is H or a $C_1$ to $C_6$ alkyl radical;

d is 0 or 1;

B is a divalent linear hydrocarbon radical —$C_nH2n$— optionally endcapped by —$(O—CH_2—CH_2)_z$—, —$(O—CH_2—CH(CH_3))_z$ or —$(O—CH_2—CH(CH_2Cl))_z$— wherein n is 2 to 12 and z is 0 to 50;

R" is either a $C_1$ to $C_{30}$ alkyl group or a polysiloxane group of formula III $$(CH_3)_3Si—O+Si(CH_3)_2O+_jCH_2— \quad \text{III}$$

wherein j is 5 to 20;

e is 0.1 to 1.0;

g is 0 to 0.5;

h is 3 to 1000; and k is 3 to 1000.

* * * * *